United States Patent
Hajian et al.

(10) Patent No.: US 8,767,217 B2
(45) Date of Patent: Jul. 1, 2014

(54) TIME DOMAIN-FREQUENCY DOMAIN OPTICAL COHERENCE TOMOGRAPHY APPARATUS AND METHODS FOR USE

(75) Inventors: Arsen R. Hajian, Toronto (CA); Bradford B. Behr, Silver Spring, MD (US); Jeffrey T. Meade, Toronto (CA); Andrew T. Cenko, Dunkirk, MD (US)

(73) Assignee: Tornado Spectral Systems, Inc., Toronto, Ontario (CA)

( * ) Notice: Subject to any disclaimer, the term of this patent is extended or adjusted under 35 U.S.C. 154(b) by 206 days.

(21) Appl. No.: 13/194,713

(22) Filed: Jul. 29, 2011

(65) Prior Publication Data

US 2013/0027711 A1    Jan. 31, 2013

(51) Int. Cl.
G01B 11/02        (2006.01)

(52) U.S. Cl.
USPC .......................................................... 356/497

(58) Field of Classification Search
USPC .................................................. 356/450–521
See application file for complete search history.

(56) References Cited

U.S. PATENT DOCUMENTS

| 6,111,645 | A  | * | 8/2000  | Tearney et al. | 356/499 |
|-----------|-----|---|---------|----------------|---------|
| 7,206,073 | B2 | * | 4/2007  | Hajian et al.  | 356/451 |
| 7,480,058 | B2 | * | 1/2009  | Zhao et al.    | 356/497 |
| 7,643,152 | B2 | * | 1/2010  | de Boer et al. | 356/497 |
| 7,724,174 | B2 | * | 5/2010  | Chang et al.   | 341/163 |
| 7,725,169 | B2 | * | 5/2010  | Boppart et al. | 600/473 |
| 7,751,063 | B2 | * | 7/2010  | Dillon et al.  | 356/511 |
| 7,841,719 | B2 | * | 11/2010 | Podoleanu      | 351/212 |
| 7,982,881 | B2 | * | 7/2011  | Fercher et al. | 356/497 |
| 2004/0027582 | A1 | * | 2/2004 | Dulman       | 356/511 |
| 2008/0285049 | A1 | * | 11/2008 | Rembe et al. | 356/497 |

FOREIGN PATENT DOCUMENTS

WO    WO 2005010597 A2 *    2/2005

OTHER PUBLICATIONS

Bajraszewski et al. (Bajraszewski, Tomasz et al., Improved spectral optical coherence tomography using optical frequency comb, Optics Express, vol. 16, No. 6 (Mar. 17, 2008), pp. 4163).*
Florjanczyk et al. (Florjanczyk, Miroslaw et al., Multiaperture planar waveguide spectrometer formed by arrayed Mach-Zehnder interferometers, Optics Express, vol. 15, No. 26 (Dec. 24, 2007), pp. 18176-18189).*
Shirai (Shirai, Tomohiro, Liquid-crystal adaptive optics based on feedback interferometry for high-resolution retinal imaging, Applied Optics, vol. 41, No. 19 (Jul. 1, 2002), pp. 4013-4023).*
Witte et al., (Witte, S. et al., Single-shot two-dimensional full-range optical coherence tomography achieved by dispersion control, Optics Express, vol. 17, No. 14 (Jul. 6, 2009), pp. 11335-11349).*

(Continued)

*Primary Examiner* — Michael A Lyons
(74) *Attorney, Agent, or Firm* — Roberts Mlotkowski Safran & Cole P.C.

(57) ABSTRACT

An optical coherence tomography (OCT) system comprising: a splitter configured to receive and split an optical source beam generating a reference beam and a sample beam, the sample beam directed at a sample and interacting with the sample to generate a return beam; a delay module configured to receive and introduce an optical delay in the reference beam, to generate a delayed reflected beam configured to interfere with the return beam to generate an interferogram; a spatial filter system capable of filtering randomly scattered light from at least one of the return beam or the interferogram; and a detector array to receive the interferogram for spatial and spectral analysis.

19 Claims, 17 Drawing Sheets

(56) References Cited

OTHER PUBLICATIONS

Haijan et al. (Haijan, Arsen R. et al., Initial Results From the USNO Dispersed Fourier Transform Spectrograph, The Astrophysical Journal, vol. 661 (May 20, 2007), pp. 616-633).*

Nugroho et al. (Nugroho, Waskito et al., Simulation of Basic Characteristics of Single-Shot Full-Field Optical Coherence Tomography Using Spatially Phase-Modulated Reference Light, Optical Review, vol. 18, No. 4 (2011), pp. 343-350).*

Wang et al. (Wang, Jingyu et al., Line-field Spectral Domain Optical Coherence Tomography using a 2D Camera, Optical Coherence Tomography and Coherence Techniques IV, Proc. Of SPIE-OSA Biomedical Optics, SPIE-OSA, vol. 7372, 737221 (2009), pp. 1-5).*

Yasuno et al. (Yasuno, Yoshiaki et al., One-shot-phase-shifting Fourier domain optical coherence tomography by reference wavefront tilting, Optics Express, vol. 12, No. 25 (Dec. 13, 2004), pp. 6184-6191).*

Hajian et al., "Initial Results from the USNO Dispersed Fourier Transform Spectrograph", The Astrophysical Journal, 2007, 661, pp. 616-633.

Florjanczyk et al., "Multiaperture planar waveguide spectrometer formed by arrayed Mach-Zehnder interferometers", Optics Express, 2007, pp. 18176-18189, vol. 15, No. 26.

* cited by examiner

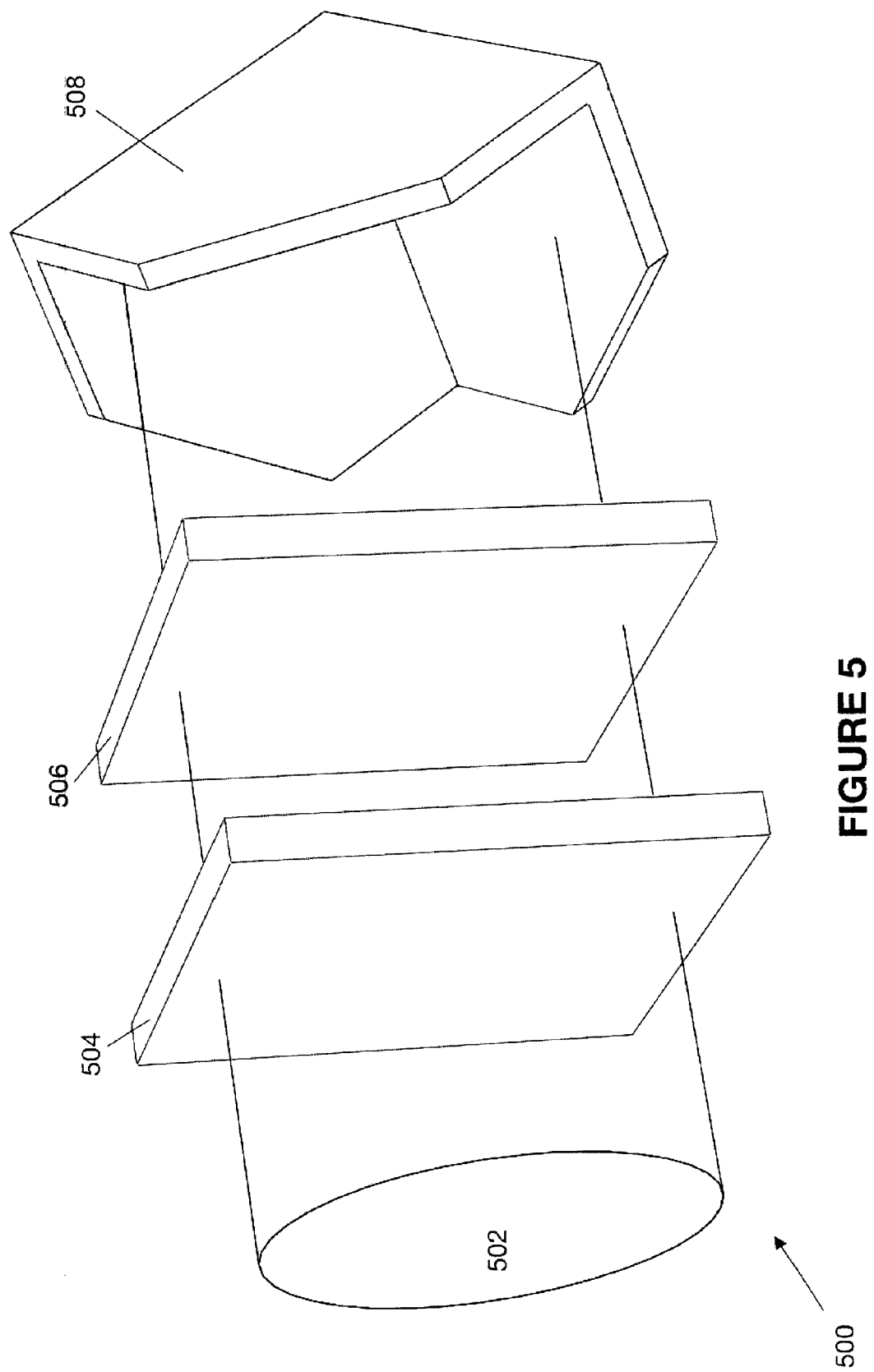

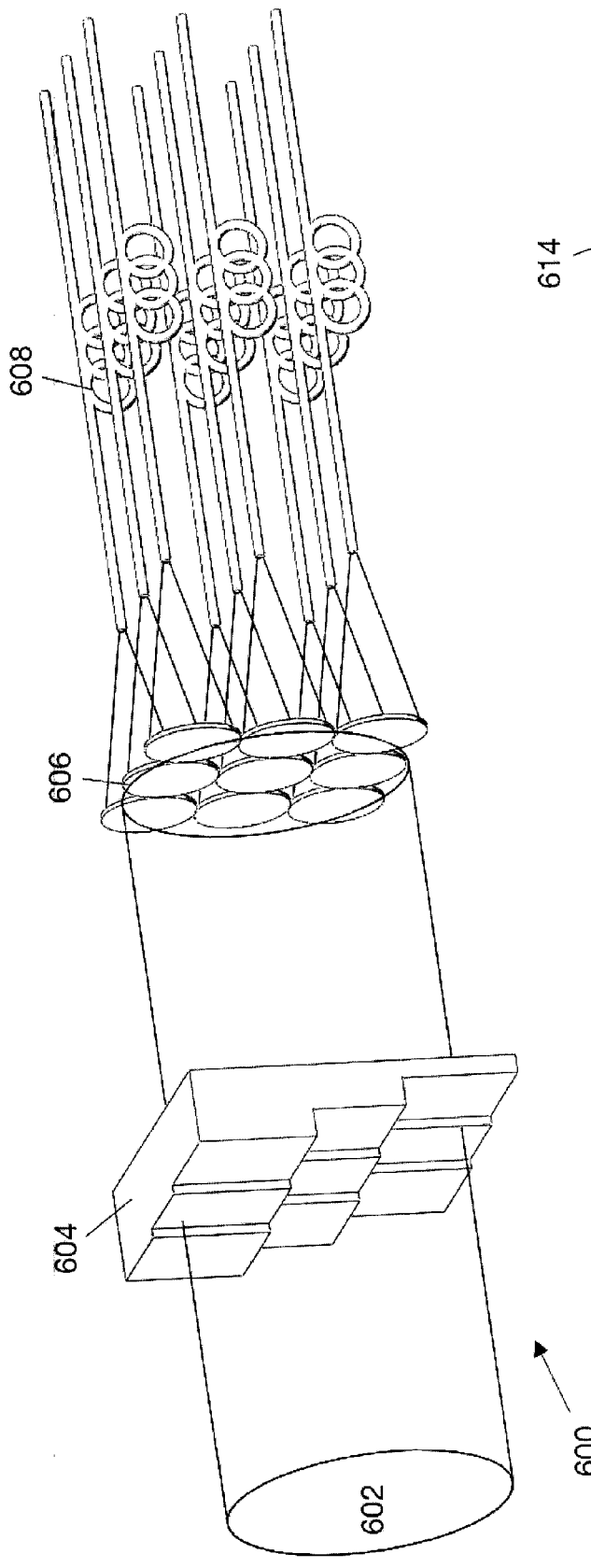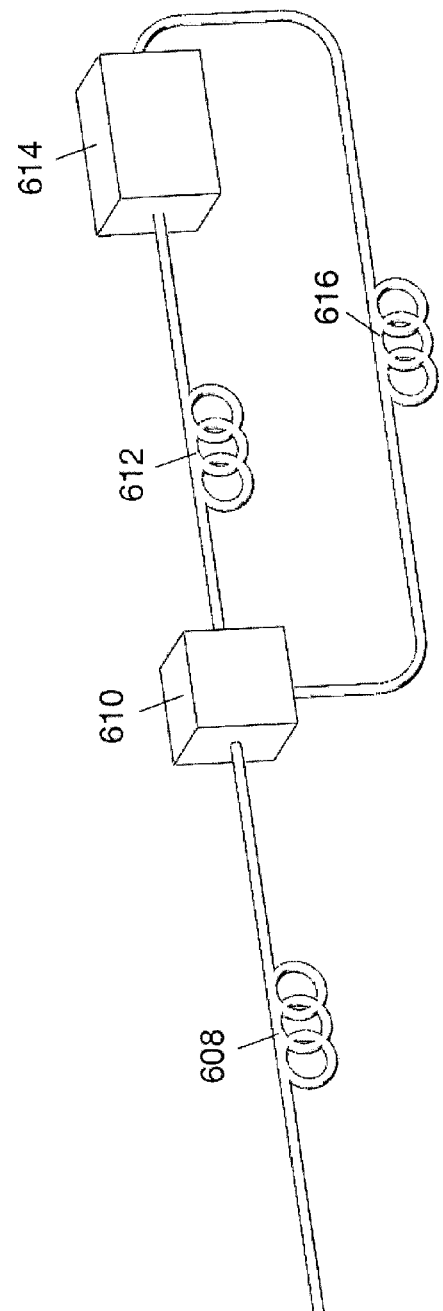
FIGURE 6A
FIGURE 6B

TIME DOMAIN-FREQUENCY DOMAIN OPTICAL COHERENCE TOMOGRAPHY APPARATUS AND METHODS FOR USE

FIELD OF INVENTION

This invention relates to optical coherence tomography and spectrometry, and more specifically relates to apparatus and methods for time domain-frequency domain optical coherence tomography.

BACKGROUND OF THE INVENTION

Optical Coherence Tomography (OCT) is an imaging technique whereby the interference properties of low-coherence light is used to generate real-time, cross-sectional and three-dimensional images. Analogous to ultra-sound, which measures reflecting sound waves, OCT measures the echoes of back scattered light passing through a sample to generate detailed sub-surface images.

OCT provides a means of imaging inhomogeneous samples, such as biological tissue. For example, due to the transparent ocular structures of the human eye, OCT technology can be used to detect macular holes, edema and degeneration as well as other eye disease. It can also be used for in-body imaging, via catheter or endoscope, to generate intravascular or intra-organ imaging scans.

OCT is an interferometric technique that splits and recombines an optical source to detect the differences between superimposed waves. Unlike ultrasound technology, which measures the time delay of a generated sound wave, interferometry measures the time delay and intensity of reflected light.

Interferometers generally consist of a single beam of light, split into two waves by a beam splitter, to generate a reference beam and sample beam of light with the same frequency and phase. In a Michelson-Morley interferometer, half transparent mirrors are used as beam splitters. Interferometry can provide a measurement of light waves reflecting off surfaces to produce an interferogram which depicts output amplitudes as a function of delay between the input spectra. The interferogram is subsequently analyzed, for example by Fourier transform analysis, to determine how the light has been altered through contact with the sample.

An OCT system generally consists of source, sample, reference and detector arms. The source light enters the interferometer and is then split into the sample arm and the reference arm. In many imaging systems, the phase of the reference beam is delayed by physically changing or adjusting the optical path distance of the reference arm which is reflected back towards the beam splitter. The sample arm reflects and/or disperses off surfaces of the sample being scanned to generate a return arm. When the two beams of light, are recombined with one another, the resulting interferogram can be recorded. The introduction of the delay allows for depth analysis of the sample, since the reference beam is delayed by a known path length equal to the depth of the sample at a particular point.

The field of OCT can be classified into two main categories of processing techniques: Time Domain OCT (TD-OCT) and Frequency Domain OCT (FD-OCT). In TD-OCT, the optical delay in the reference arm is rapidly varied, and the amount of light reflected at a specific depth of the sample can be calculated by measuring the strength of the interference signal as a function of time. Each depth corresponds to a different time step, which is measured using the reference arm. By matching the path lengths of the sample arm and reference arm of light, the back-reflected light can be constructively interfered with the light from the reference arm. Thus, by varying the optical path distance, or delay, different depths of the sample can be imaged. To generate 3D-images, OCT synthesizes cross-sectional images from a series of laterally adjacent depth-scans.

In FD-OCT, the depth information in the signal is extracted by measuring the interference spectrum of the signal. The delay in the reference arm is typically fixed, but the illumination source is broadband light, so different wavelengths of light will experience different amounts of interference, which can be measured by sending the broadband interference signal through a dispersive spectrograph. FD-OCT can increase imaging speed by allowing for imaging of all depths at once. Unlike with TD-OCT where rapid image acquisition can be limited by mechanical scanning in two directions (axial and lateral), FD-OCT techniques can tend to provide faster OCT imaging as they may require only one mechanical lateral scan.

Independent of the FD-OCT technique, spectroscopic analysis of light reflected from a sample can also be used to determine the composition and material structure of a sample. This technique is based on the principle that every molecular structure exhibits a unique absorption pattern, with absorption peaks corresponding to the frequencies of vibrations between the bonds of the atoms making up the material. Since the intensity of spectral features in reflectance is a function of the intrinsic absorption strength, scattering properties, and abundance of a material, no two compounds produce the same spectrum, and thus tending to allow for positive identification of materials.

In FD-OCT systems because a given feature in an observed spectrum can be due to either molecular absorption or interferometric signal, and the two phenomena cannot be distinguished a priori without additional information, spectroscopic molecular analysis cannot be combined. The current invention describes several approaches for simultaneously extracting spatial and spectral information from a sample by collecting additional information which removes the ambiguity between interference fringes and absorption features.

In OCT three-dimensional (3D) imaging, resolution can be defined in both the transverse and axial directions. The axial resolution is limited by the coherence length of the illumination source, which is inversely proportional to the spectral bandwidth. Because it uses low coherence light interference, conventional OCT systems can provide high resolution imaging data; however, the lateral resolution can be limited by an insufficient transversal sampling rate or the size of the probe beam diameter.

SUMMARY OF INVENTION

Conventional OCT requires transverse scanning of the illumination spot in one or two directions to obtain cross-sectional images. In such interferometric systems, the optical path length of the reference arm is modulated by mechanical means such as a rotating mirror. The TD-OCT approach in conventional systems can be hampered by the relatively complicated optical and mechanical designs needed to scan extremely small delays at rapid rates in order to achieve real-time imaging. These mechanical components tend to limit the speed at which imaging can be completed. As a result, it is desirable to have spectrometers and imaging systems capable of real-time imaging, where path delay is introduced almost instantaneously.

In an aspect of the present invention, an optical coherence tomography (OCT) system is provided, the OCT system comprising: a splitter configured to receive and split an optical source beam generating a reference beam and a sample beam, the sample beam directed at a sample and interacting with the sample to generate a return beam; a delay module configured to receive and introduce an optical delay in the reference beam, to generate a delayed reflected beam configured to interfere with the return beam to generate an interferogram; a spatial filter system capable of filtering randomly scattered light from at least one of the return beam or the interferogram; and a detector array to receive the interferogram for spatial and spectral analysis.

In some embodiments, the spatial filter system can comprise a first lens to receive and focus the at least one of the return beam or the interferogram; a pinhole to receive the focused at least one of the return beam or the interferogram and outputting a conical filtered beam; and a second lens to receive and collimate the conical filtered beam.

In some embodiments, the delayed reflected beam and the return beam can each be directed to the splitter, and the interferogram is generated by the splitter. In some embodiments, the delay module can apportion the reference beam into a plurality of portions and introduces the optical delay into each of the portions, where, in some embodiments, each portion can have a different optical delay.

In some embodiments, the delay module can be a liquid crystal retarder and in other embodiments, the delay module can comprise a delay element and a reflective element where, in such embodiments, the delay element can be a stepped plate, a multi-subpupil liquid crystal retarder or a reflective stepped plate.

In some embodiments, the delay module can comprise a stepped delay element to generate the plurality of portions, each of the portions being received by a three-port optical circulator optically connected to an amplitude modulating device to generate a modulated delayed reflected beam from each of the portions.

In some embodiments, the delay module can comprise a reflective element and a four-port optical circulator to generate the delayed reflected beam, wherein a port of the four-port optical circulator can be capable of directing the reference beam to the reflective element which is positioned to generate the optical delay.

In some embodiments, the delay module can further comprise a plurality of reflective surfaces arranged to positionally separate at least one of the delayed reflected beam or the interferogram. In some embodiments, the delay element can introduce the optical delay prior to and after the reference beam is reflected off the reflective element.

In some embodiments, the splitter can be a cube splitter, a rectangular splitter or a pellicle splitter and in other embodiments, the OCT system can further comprise a dispersive element for receiving the interferogram and generating a plurality of narrowband interferograms representative of a spectra of the interferogram, wherein the detector array receives the plurality of narrowband interferograms for spectral analysis.

In some embodiments, the optical source can be tunable optical source, and in some embodiments, the splitter, the spatial filter system, the delay module and the detector can each be formed on a planar substrate.

In another aspect of the present invention, a method of obtaining spatial and spectral information about a substance is provided, the method comprising: splitting an optical source beam into a reference beam and a sample beam; interacting the sample beam with the sample to generate a return beam; introducing a plurality of delays into the reference beam to generate a plurality of delayed return beam portions; interfering each of the delayed return beam portions with the return beam to generate a set of interferograms; extracting an interference spectrum from each of the interferograms, each interference spectrum corresponding to a depth of the substance at a scanned location at which the sample beam interacted with the sample; and extracting a spectral reflectivity for each of the interference spectrums to determine color of the substance at the depth of the substance at the scanned location.

In some embodiments, the step of extracting the interference spectrum can comprise using a Fourier transform and the step of extracting the spectral reflectivity can comprise using least-squares modeling.

BRIEF DESCRIPTION OF THE DRAWINGS

For a better understanding of embodiments of the system and methods described herein, and to show more clearly how they may be carried into effect, reference will be made by way of example, to the accompanying drawings in which:

FIG. 5 shows an embodiment of a delay module having a transmissive delay element based on variable index change for use in a TDFD-OCT system;

FIGS. 6A, 6B, 6C and 6D show an embodiment of a delay module having a transmissive delay element having time encoding for use in the OCT system of FIG. 7;

DETAILED DESCRIPTION

Figure 1:
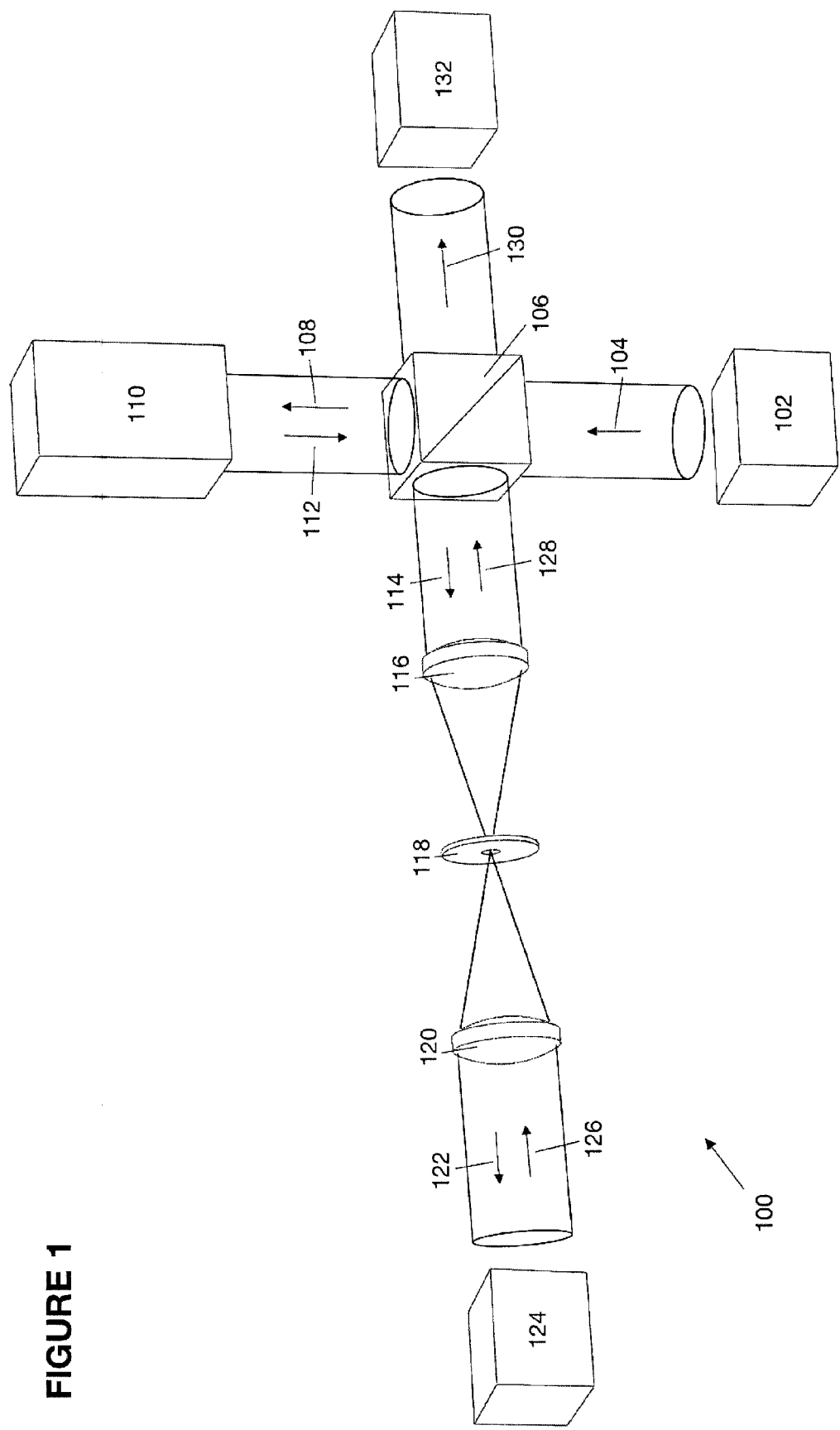
FIG. 1 shows an embodiment of a time domain-frequency domain OCT system.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Furthermore, this description is not to be considered as limiting the scope of the embodiments described herein in any way, but rather as merely describing the implementation of the various embodiments described herein. Additionally, skilled persons will appreciate that while examples and embodiments provided herein may refer to OCT imaging or system, other analysis techniques that use spectrometers and spectrometry to analyze characteristics or image substances can use the spectrometers and imaging systems described herein.

Referring to FIG. 1, TDFD-OCT system 100 is shown, comprising optical source 102, beam splitter 106, delay module 110, spatial filter system 134 (comprising pinhole 118 and lenses 116 and 120) and detector system 132. Detector system 132 may include a dispersive element, a focusing lens, and a line or array detector; however, skilled persons will appreciate that these additional elements can be optional or replaced by other variants to accomplish similar functionality.

In operation, optical source 102 emits collimated source beam 104; however, in some embodiments, where optical source 102 does not emit a collimated beam, a collimating lens or other collimating optics may be used. Collimated source beam 104 is received by beam splitter 106, which in some embodiments can be a 50:50 cube beam splitter, a rectangular splitter, a pellicle splitter, or other appropriate optical beam splitter. Beam splitter 106 splits the collimated source beam 104 into sample beam 114, which is directed toward sample 124, and reference beam 108, which is directed towards delay module 110.

In the embodiment shown, sample beam 114 is focused by lens 116 on to pinhole 118, and the resulting diverging beam is recollimated by lens 120; however, skilled persons will appreciate that other optical elements can be used to recollimate the diverging beam, such as mirrors. The resulting sample beam 122 is directed to the target sample 124. In some embodiments, sample beam 122 is focused on to the sample using a lens or other focusing element. Light reflected from the surface and interior of sample 124 returns to the system as collimated return beam 126, which passes again through lens 120, pinhole 118, and lens 116, re-entering the beam splitter 106 as sample return beam 128. In the embodiment shown, sample beam 122 can penetrate the outer surface of sample 124 and portions of sample beam 122 can be reflected and/or dispersed off one or more inner surfaces of sample 124. Additionally, portions of sample beam 122 may be reflected and/or dispersed off the outer surface of sample 124, and/or may be absorbed by one or more surfaces of sample 124. Skilled persons will appreciate that the behavior of sample beam 122 as it interacts with sample 124 can be dependent on the material, shape and/or composition of sample 124.

In the embodiment shown, return beam 126 is refocused by lens 120 on to pinhole 118, which is configured to filter randomly scattered light or glare, and to allow light that is reflected back on axis to exit pinhole 118. The return beam is recollimated by lens 116 into sample return beam 128, which directed towards beam splitter 106.

Reference beam 108 is directed towards delay module 110 which introduces one or more optical delays in reference beam 108. The resulting return beam 112 is directed towards beam splitter 106. Delay module 110 may include reflective and/or transmissive optical elements, which may for example change the optical delay via external manipulation of the properties of the material and/or physical structure of the elements. For example, in some embodiments, subcomponents of delay module 110 can be a liquid crystal whereby applying a controlled voltage to the liquid crystal can alter the refractive index of the liquid crystal to adjust the optical delay introduced by delay module 110. In other embodiments, delay module 110 can include one or more electro-optical phase modulators, or any other optical component that can change the optical path length or create an optical delay in a received optical beam without requiring physical motion of delay module 110.

In some embodiments, delay module 110 can divide reference beam 108 into a plurality of sub-pupils, for example where delay module 110 is a phase mask consisting of different thicknesses of glass, such that each sub-pupil has a different optical delay or optical path length.

In some OCT systems a delay may be introduced into a reference beam by repositioning a reflective element and/or by moving particular elements to increase or decrease the optical path length difference between a reference beam and a sample beam; however, in the embodiment shown, a delay is introduced into reference beam 108 without physically moving or repositioning the elements of TDFD-OCT system 100.

Beam splitter 106 receives delayed return beam 112 and sample return beam 128 and then directs a portion of delayed return beam 112 and sample return beam 128 into interference beam 130, within which the portions of delayed return beam 112 and sample return beam 128 into interference beam 130 interfere to generate an interferogram signal. This interference signal is measured by detector system 132.

Figure 11:
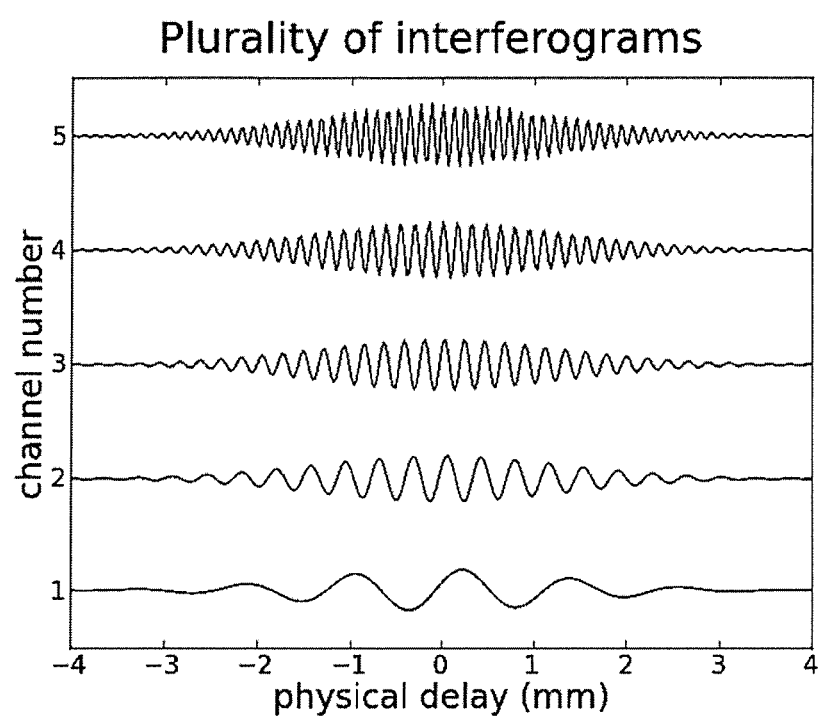
FIG. 11 shows a set interfero grams generated by an embodiment of a time domain-frequency domain OCT system in several spectral channels.

By way of example, in embodiments where OCT system 100 is used for OCT imaging, sample return beam 128 is comprised of coherent optical signals and are returned to splitter 106 after reflecting and/or dispersing off one or more surfaces of sample 124. Sample return beam 128 is interfered with delayed return beam 112, generating an interference pattern (or interferogram). In embodiments having a plurality of delay lines, a plurality of interferograms (as depicted in FIG. 11, for example) are produced with each corresponding to a particular optical path length.

Analysis of the measured interferograms can produce a data set representative of sample 124 comprising spectral and spatial information (a collection of interference spectra for various delay positions introduced by delay module 110). By obtaining the interference spectrum at each of the different delay positions, for example by Fourier transform of the interference spectrum at each of the delay positions, the spatial information representative of the depth of each surface of sample 124 can be extracted. For example, in such embodiments, when the optical path length of the sample signal is equal to the optical path length of the reference signal (i.e. the optical delay), the interferogram generated for that delay position is representative of sample 124 at a particular depth corresponding to the optical path length.

By dispersing each of the interferograms into a plurality of narrowband interferograms at each delay position (for example using a dispersive element) where each narrowband interferogram is representative of a wavelength band at that delay position, spectral information can be extracted for each of the delay positions. In such embodiments, the spectra can be analyzed to determine, for example, the color of sample 124 at the depth corresponding to that delay position. In some embodiments, other information can be extracted such as the scattering coefficient spectrum, phase of the interference signal and depth dependent signal attenuation. Additionally, using a combination of the various spectra collected at each delay can tend to result in an increase in signal-to-noise ratio.

Using the phase of the interference signal, the range of the image can be expanded by allowing reconstruction on both sides of the central fringe and the effect of self-interference terms can be reduced. In other embodiments, depth dependent signal enhancement can be achieved by using the measurement of the depth dependent signal attenuation. These techniques can be achieved in OCT by the use of balanced detection; however skilled persons will understand that instrument balanced detection may not be required in all instances.

In some embodiments, such as OCT applications, the set of interferograms generated by TDFD OCT system 100 can be representative of a three dimensional depth image of sample 124, if the sample beam 122 is scanned laterally across the surface of sample 124. In some embodiments, the data set can be a collection of interference spectra for various delays introduced by delay module 110 and through signal processing, the spatial information about the portion of sample 124 that received sample signal 122 can be extracted. In some embodiments, the set of interferograms generated can consist of a 4-dimensional (4D) data cube with signal intensity as a function of wavelength, optical path length difference (i.e. optical delay) and the (X,Y) position (or other 2-dimensional co-ordinate system) of sample 124 that is scanned. The resulting analysis can additionally be 4 dimensional, with reflectance intensity as a function of wavelength at each (X, Y, Z) point within sample 124.

In some embodiments, interferogram beam 130 can be described by $$Ik, dref = IRk + jISk, dj + 2jIRkISk, dj\psi k, dj, drefei2kdj - dref + jk \approx jISk, djISk, dk\psi k, dj, dkei2kdj - dk,$$

where $I_R$ is delayed return beam 112 intensity, $I_S$ is sample return beam 128 intensity, $\psi$ is the coherence function, k is the wavenumber given as $2\pi/\lambda$ where $\lambda$ is the wavelength of light, $d_j$ is the physical distance of the $j^{th}$ surface of sample 124 that sample beam 122 reflects off, and $d_{ref}$ is total optical path length of reference beam 108 and delayed return beam 112. In the embodiment, the first term is delayed return beam 112 intensity expressed as a function of wavenumber, the second term is the summation of sample return beam 128 intensities for each reflection location off surfaces of sample 124, the third term is the interference term between delayed return beam 112 and sample return beam 128, and the final fourth term is the self-interference term of the sample return beam 128.

In the time domain, an interferogram generated by an OCT system can be measured as a function of that OCT systems reference arm delay, $d_{ref}$, with the right hand side of the equation being integrated over all wavenumbers. In the frequency domain, an interferogram generated by an OCT system can be measured as a function of wavenumber with a fixed reference arm delay, meaning $d_{ref}$ can be regarded as a constant in FD-OCT systems. In the embodiment of a TDFD-OCT system, an interferogram generated by the TDFD-OCT system, such as TDFD-OCT system 100, can be recorded both as a function of wavenumber and reference arm delay.

Figure 12:
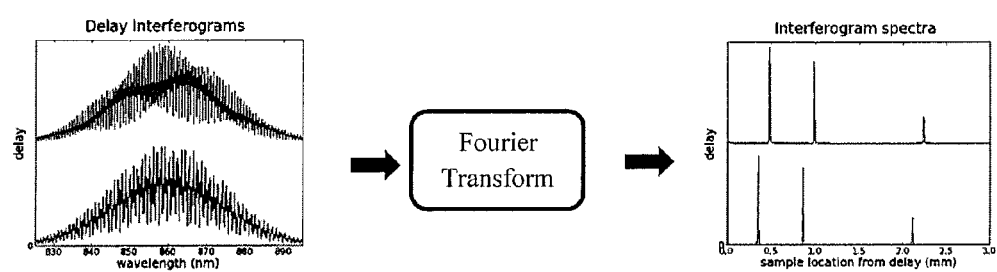
FIG. 12 shows an interferogram spectrum generated by an embodiment of a time domain-frequency domain OCT system using Fourier transforms.

Through calibration of TDFD OCT system 100, a known coherence function, $\psi$ (k,d), can be determined and the reference arm spectrum IR(k), which, in the data extraction process, will be assumed to be known quantities of interferogram beam 130. In some embodiments, if delayed return beam 112 is blocked, the summation of the second and fourth terms in the above equation can be measured (it is noted that these terms are not a function of the delay introduced by delay module 110). By measuring the signal with both delayed return beam 112 and sample return beam 128 being unblocked, interferogram beam 130 can be detected and analyzed by detector array 132. In some embodiments, interferogram beam 130 can be analyzed using Fourier transformation techniques, as shown in FIG. 12, which can result in obtaining spatial information, for example, the locations and/or depths of the surfaces of sample 124 that sample beam 122 is interacting with, dj, and the total reflectance value can be summed over all wavenumbers.

Figure 14:
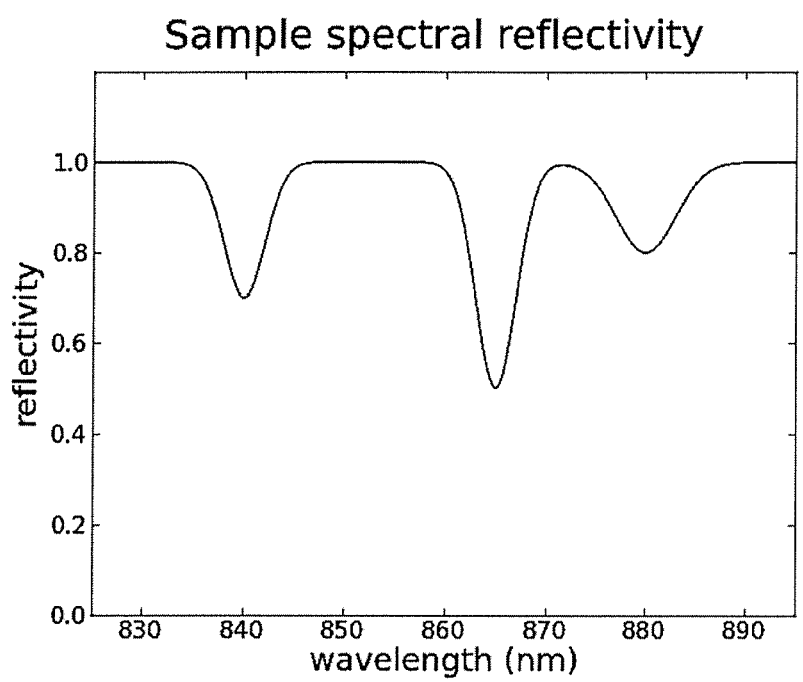
FIG. 14 shows the spectral reflectivity for a sample at a given depth generated by an embodiment of a time domain-frequency domain OCT system.
Figure 15:
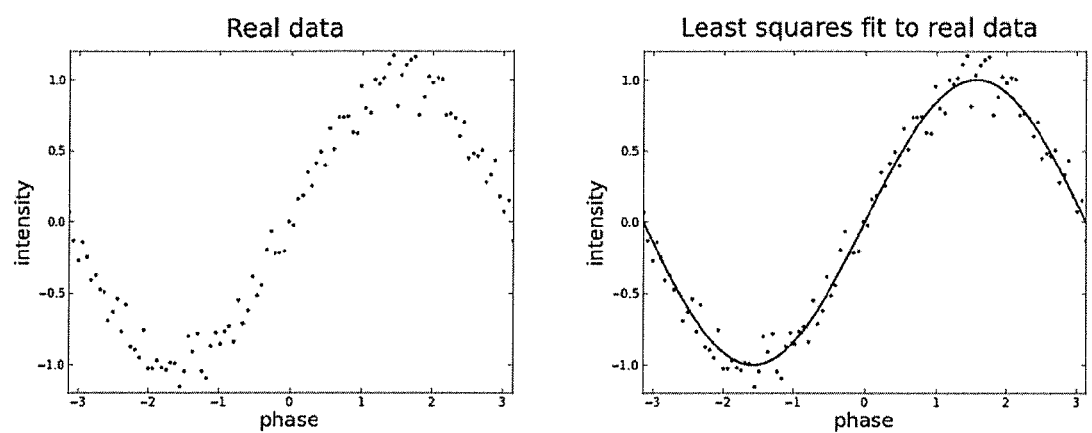
FIG. 15 shows data generated by an embodiment of a time domain-frequency domain OCT system wherein the data is displayed using least-squares fit modeling.

As shown in FIG. 15, spectral information can be extracted by least-squares modeling techniques. In some embodiments, by measuring the interferogram generated at different delays introduced by delay module 110, the third term of the above equation can be isolated from the above equation and further processing can extract the spectral information. For example, as discussed above, since the summation of the second and fourth terms of the above equation and the coherence function, $\psi$, can be independently measured, and it can tend to be assumed that the locations and/or depths of the surfaces of sample 124 that sample beam 122 is interacting with, dj, can be closely approximated by the FD-OCT processing techniques. For example, a least-squares model for sample beam 122 reflectivity spectra (as depicted in FIG. 14) for each delay introduced by delay module 110, IS(k,dj), can be performed. In such embodiments, a least-squares approach takes an initial guess at sample beam 122 reflectivity spatial-spectral function, computes a model interference pattern from this guess, measures the difference between the actual measured value and the model, then updates the guess. This difference can be referred to as the chi-squared value and it is computed as $$\chi samp2 = Isampk, dj - Ifit(k,di) \, 2,$$

where the subscripts samp and fit refer to the measured interferogram beam 130 where reference beam 108 is blocked (i.e. the measured interferogram beam resulting from sample beam 122 interacting with sample 124). A change in some of the parameters for the model can result in a new model and a different chi-squared value can be computed. The model that results in the smallest value of chi-squared is can be accepted as the correct model. This process can use partial derivatives of the model equation with respect to the variable parameters. Depending on the fit model chosen for an embodiment, these partial derivatives can be different.

The result of this process can produce a reconstruction of sample beam 122 reflectivity spectra as a function of the location and/or depth of sample 124 that sample beam 122 has interacted with, $I_S(k,d_j)$. The accuracy of the resulting model for the sample data can be validated by computing the chi-squared value for interferogram beam 130 for various different delays introduced by delay module 110. It will be recognized that the above mentioned technique is only one such approach to TDFD-OCT signal processing, and there may be many other techniques for processing.

In addition to the spectral information extraction, in some embodiments recording the OCT interference signal at various different reference arm delay positions can allow absolute phase retrieval, and thus allowing complex image reconstruction to double the image resolution, and also tending to enhance the signal-to-noise ratio at different locations in the image due to overlap in the sensitivity functions.

Figure 2:
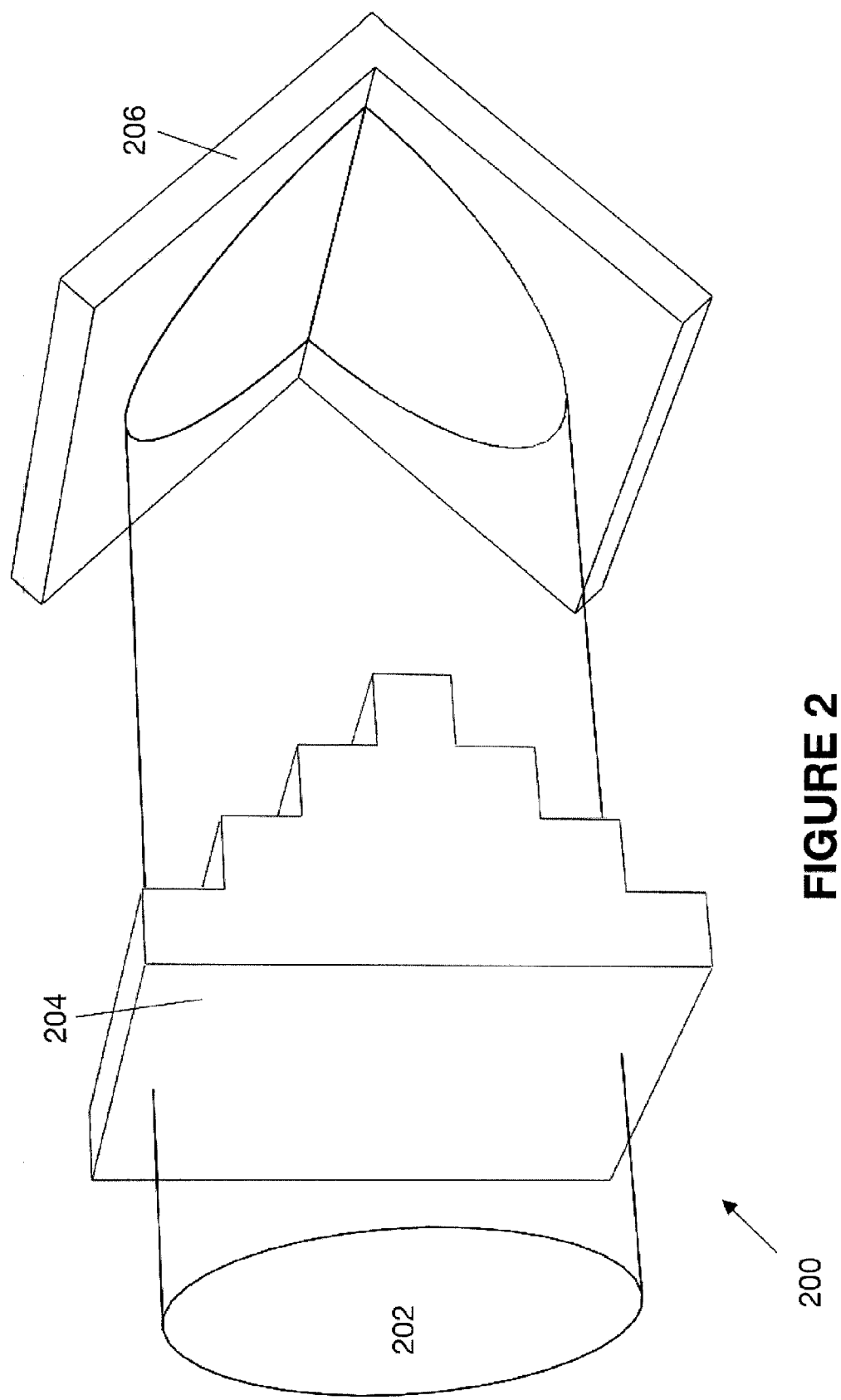
FIG. 2 shows an embodiment of a delay module having a transmissive delay element with a roof-mirror or reflector for use in the OCT system of FIG. 1.

With reference to FIG. 2, delay module 200 is shown which can be used as delay module 110 in TDFD OCT system 100. Delay module 200 is configured to introduce multiple optical delays in reference beam 108. In the embodiment shown, delay module 200 includes a transmissive delay element 204 consisting of stepped material having a different index of refraction than the surrounding medium, and where each step introduces a different optical delay in received optical beam 202 (which, in some embodiments, is reference beam 108). In the embodiment shown, delay element 204 can be made of optical quality glass, for example BK7, and each step element can be one micron to one millimeter in height; however, skilled persons will understand that alternative heights can be used. While the embodiment of FIG. 2 shows seven steps, the number of steps for delay element 204 can range in the hundreds or even in the thousands, and can provide optical delay ranges from tens of microns to several millimeters or more. The number of steps and the overall range of optical delays introduced by transmissive delay element 204 can be determined based on a desired signal-to-noise ratio of the OCT system incorporating delay module 200, and in some embodiments can be based on the number of spectral channels desired and/or the axial resolution of a color voxel in an image produced using a medical imaging system incorporating such a device.

In use, optical beam 202, which in the embodiment shown is a pupil optical signal, is transmitted through delay element 204, and optical beam 202 is sub-sectioned into a plurality of segments each having a different optical delay, depending on which step of delay element 204 that a particular segment of optical beam 202 is transmitted through. After optical beam 202 is transmitted through delay element 204, it is received by reflective element 206 and reflected off reflective element 206 to generate a delayed reflected beam back along substantially the same path as optical beam 202, where the delayed reflected beam comprises a plurality of segments corresponding to the segments generated by delay element 204, each having a different optical delay. In the embodiment shown, reflective element 206 is a roof-mirror; however, skilled persons will appreciate that other reflective elements, such as a flat minor (as shown in FIG. 3) can be used.

In the embodiment shown, the total length between delay element 204 and reflective element 206 can be on the order of tens of centimeters and would typically be less than one meter; however, skilled persons will appreciate that other positional arrangements are possible. Delay element 204 shown in FIG. 2 can be used in a narrowband OCT system, for example a swept-source OCT system or other parallel OCT system.

Figure 3:
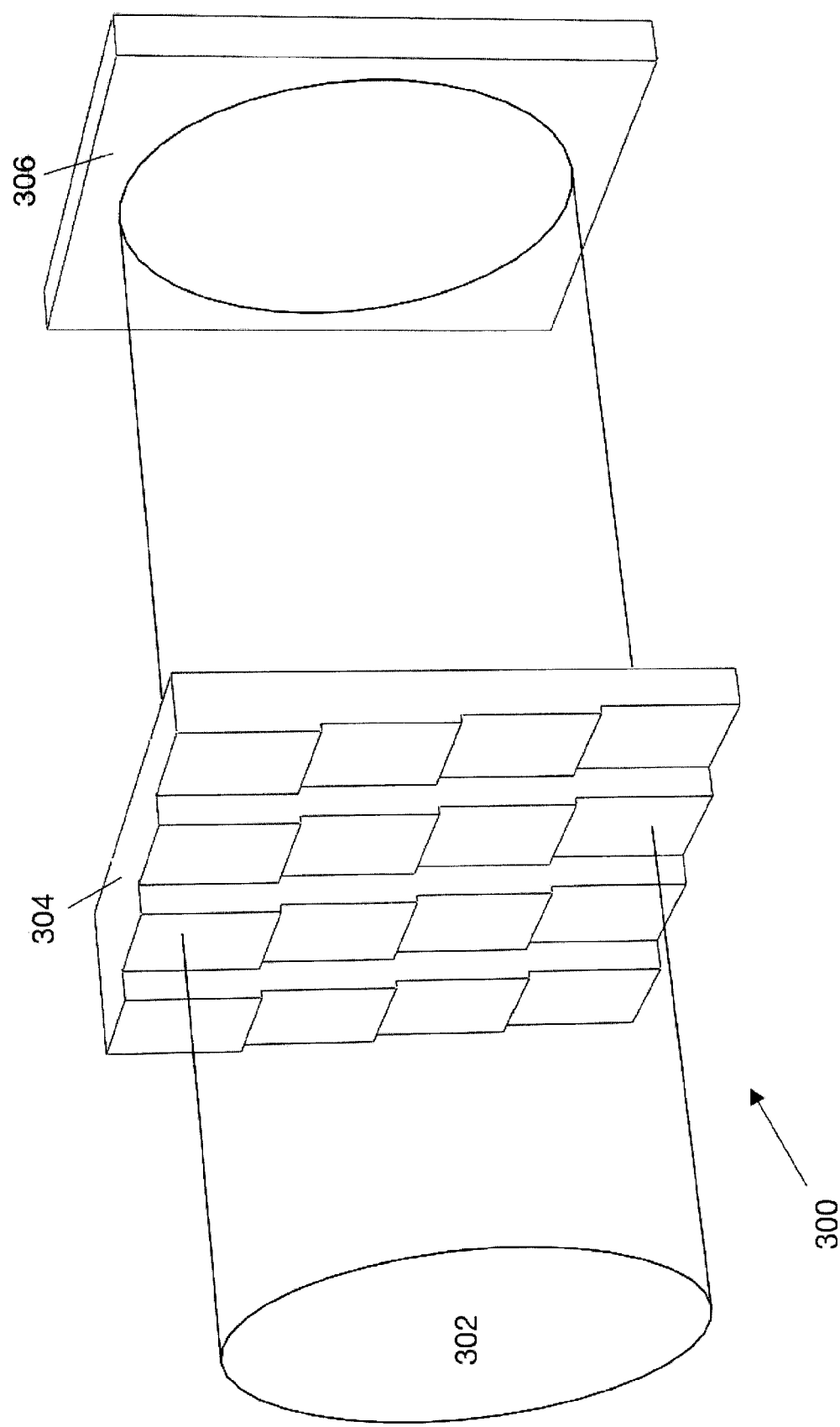
FIG. 3 shows an embodiment of a delay module having a transmissive delay element with a flat mirror for use in the OCT system of FIG. 1.

Referring to FIG. 3, delay module 300 is shown which can be used as delay module 110 in TDFD OCT system 100. Delay module 300 is configured to introduce an optical delay in reference beam 302. In the embodiment shown, the module contains delay element 304, which is a stepped material having a different index of refraction than the surrounding medium and where each step introduces a different optical delay in a received optical beam. In the embodiment shown, delay element 304 can be made of optical quality glass, for example BK7 and each step element can be one micron to one millimeter in height; however, skilled persons will understand that alternative heights can be used. While the embodiment of FIG. 3 shows sixteen steps, the number of steps for delay element 304 can range in the hundreds or even in the thousands, and can provide optical delay ranges from tens of microns to several millimeters.

In use, reference beam 302, which in the embodiment shown is a pupil optical signal, is transmitted through delay element 304, and reference beam 302 is sub-sectioned into a plurality of segments each having a different optical delay, depending on which step of delay element 304 that section of reference beam 302 is transmitted through. After reference beam 302 is transmitted through delay element 304, it is received by reflective element 306 and reflected off reflective element 306 to generate a delayed reflected beam back along substantially the same path as reference beam 302, where the delayed reflected beam comprises a plurality of segments corresponding to the segments generated by delay element 302, each having a different optical delay. In the embodiment shown, reflective element 306 is a flat mirror; however, skilled persons will appreciate that other reflective elements may be used instead.

In the embodiment shown, the total length between delay element 304 and reflective element 306 can be on the order of tens of centimeters and would typically be less than one meter; however, skilled persons will appreciate that other positional arrangements are possible. Delay element 304 shown in FIG. 3 can be used in a narrowband OCT system, such as, for example, a swept-source OCT system or other parallel OCT system.

Figure 4:
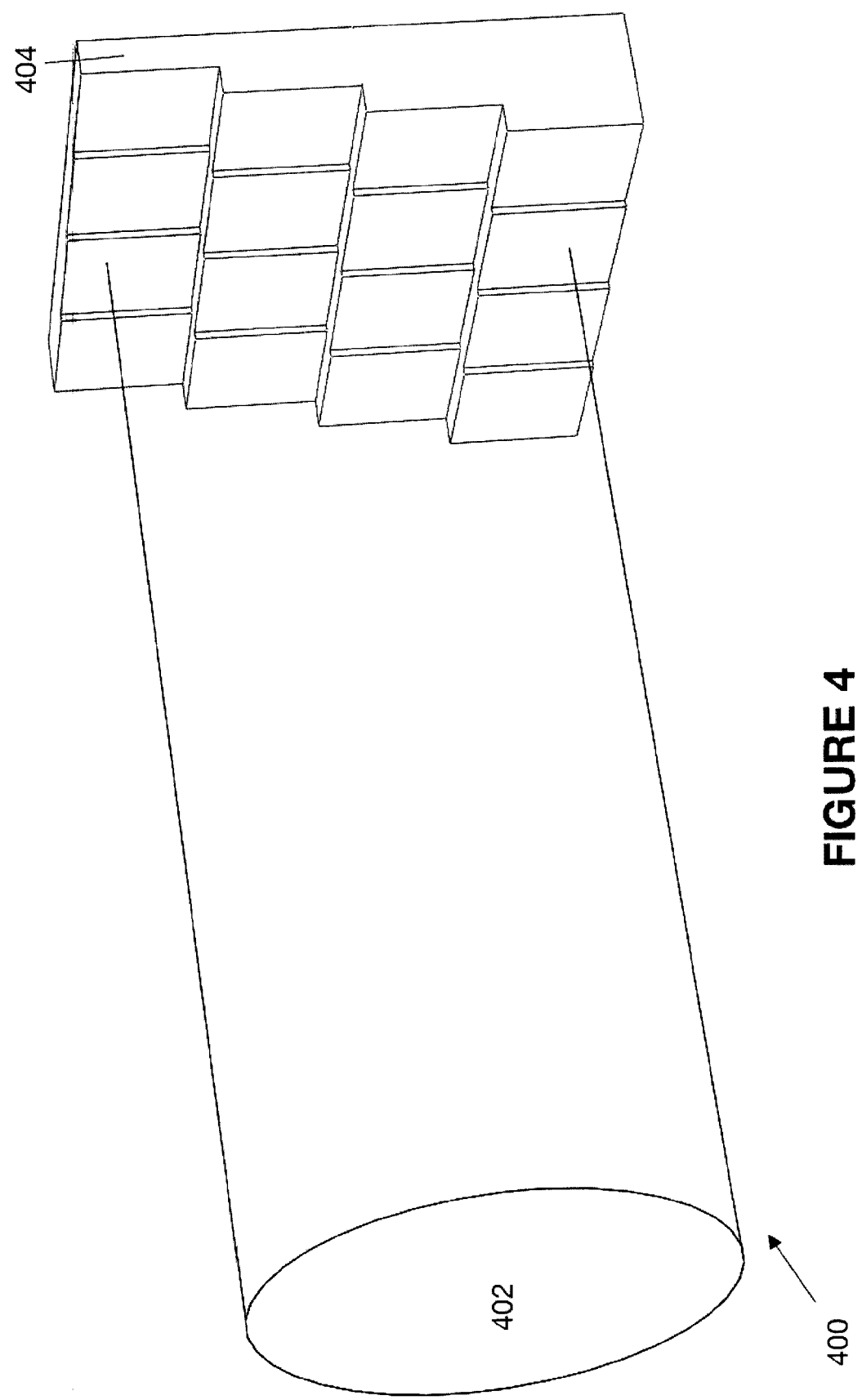
FIG. 4 shows an embodiment of a delay module having a reflective delay element for use in the OCT system of FIG. 1.

Referring to FIG. 4, delay module 400 is shown, which can be used in TDFD OCT system 100 as delay module 110. In the embodiment shown, delay module 400 consists of reflective delay element 404, a stepped mirror. Each step of reflective delay element 404 can be one micron to one millimeter in height; however, skilled persons will understand that alternative heights can be used. While in the embodiment of FIG. 4 sixteen steps are shown, the number of steps can range in the hundreds or even in the thousands, and can provide optical delays from tens of microns to several millimeters.

In use, reference beam 402, which in the embodiment shown is a pupil optical signal, is transmitted towards reflective delay element 404 and reflects off each step, generating a plurality of segments, each having a different optical path length corresponding to a different optical delay. In the embodiment shown in FIG. 4, reflective delay element 404 can be used in a broadband OCT system, such as spectral domain OCT systems or other parallel OCT systems.

Referring to FIG. 5, delay module 500 is shown, which can be used in TDFD OCT system 100 as delay module 110. In the embodiment shown, delay module 500 includes transmissive delay elements 504 and 506, each with a controllable variable index of refraction, capable of being externally controlled, such as by a voltage change. While in the embodiment shown, there are two transmissive delay elements 504 and 506 shown, skilled persons will understand that in other embodiments only one transmissive delay element may be used, while in other embodiments a plurality of transmissive delay elements can be used ranging to the hundreds or thousands.

In some embodiments, transmissive delay elements 504 and 506 can be constructed of a liquid crystal variable retarder whereby its index of refraction can change as a function of voltage.

In the embodiment shown, the optical delay that transmissive delay elements 504 and 506 can provide is up to three hundred nanometers in a single pass; however, skilled persons will appreciate that other levels of optical delay can be provided by transmissive delay elements 504 and 506 and such levels of delay can be based on the application that transmissive delay elements 504 and 506 are being used for.

In the embodiment shown in FIG. 5, the distance between transmissive delay elements 504 and 506 can be several millimeters, while in other embodiments there can be no separation between transmissive delay elements 504 and 506. Skilled persons will understand that the performance of transmissive delay elements 504 and 506 may not be dependent on the distance of separation between the transmissive delay elements; however, it can tend to be beneficial to keep the separation distance small.

Figure 6C:
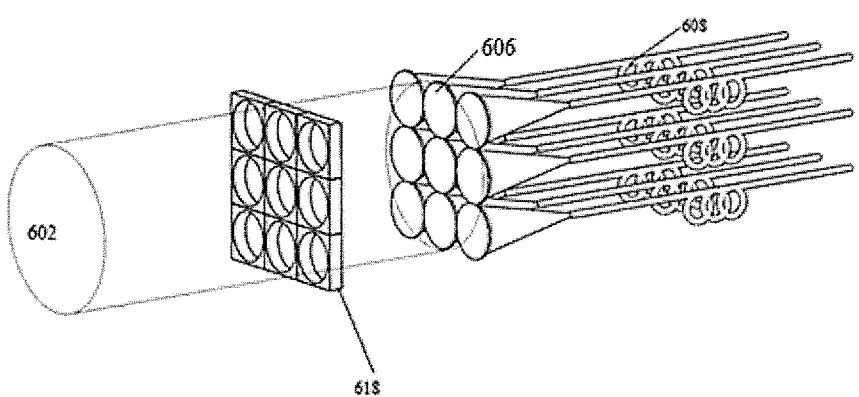

In the embodiments shown, transmissive delay elements 504 and 506 introduce a delay into reference beam 502 which is transmitted to reflective element 508 to generate a reflected delay beam directed back along substantially the same path of reference beam 502. Skilled persons will appreciate that in some embodiments transmissive delay elements 504 and 506 can be a multi-subpupil liquid crystal (depicted as element 618 in FIG. 6C, discussed below) that can introduce a plurality of delays in segments of reference beam 502. While in the embodiment shown, reflective element 508 is a corner-cube retroreflecting mirror, skilled persons will appreciate that other reflective elements, such as flat mirrors can be used.

In the embodiment shown, skilled persons will appreciate that, since transmissive delay elements 504 and 506 do not segment reference beam 502 into a plurality of segments or sub-pupils, but instead introduce an optical delay into reference beam 502, transmissive delay elements 504 and 506 can be used in narrowband OCT systems, such as swept source OCT system or other serial type OCT system.

With reference to FIGS. 6A 6B, 6C and 6D, transmissive delay system is shown having time encoding features that can be used with OCT system 700 (shown in FIG. 7, and described further below) performing the function of delay module 714. In the embodiment shown, the transmissive delay system comprises stepped delay element 604, lenslet array 606 and a plurality of fiber elements 608 each optically connected to an optical circulator 610 each of which is optically connected to amplitude modulating device 614. In the embodiment shown in FIG. 6, stepped delay element can be used with OCT system 700 as delay module 714. The remaining elements of the embodiment shown in FIG. 6 (lenslet array 606, fiber elements 608, optical circulator 610 and modulating device 614) operate to return an optical beam back along substantially the same path it originated from, performing similar functionality to other delay modules of OCT system 700. Thus, delay modules, or any reflective element of an OCT system, can include elements or combinations of elements which work together to receive an optical beam and transmit it back along substantially the same path it originated from as well as performing other functions that may be described herein, such as modulating an optical beam.

Stepped delay element 604 is a stepped material having a different index of refraction than the surrounding medium, whereby each step of stepped delay element 604 introduces a different optical delay in a received optical beam. Stepped delay element 604 can be made of optical quality glass, for example BK7 and each step element can be one micron to one millimeter in height; however, skilled persons will understand that alternative heights can be used. While the embodiment of FIG. 6 shows nine steps, skilled persons will understand that the number of steps for stepped delay element 604 can be in the hundreds or, in some embodiments, in the thousands, which can provide optical delays from tens of microns to several millimeters.

In use, reference beam 602, which in the embodiment shown is a pupil optical signal, is transmitted through stepped delay element 604 and reference beam 602 is sub-sectioned into a plurality of segments each having different optical delays depending on which step of stepped delay element 604 reference beam 602 passes through.

Each segment is received by a lens of lenslet array 606, which is positioned at a distance from stepped delay element 604, in some embodiment ranging from 1 millimeters to 2 centimeters. Each lens of lenslet array 606 focuses each segment (each having a different optical delay introduced by stepped delay element 604) into one of a plurality of fiber elements 608, with each fiber element, in the embodiment shown, being a single mode fiber and each of the plurality of fiber elements 608 being substantially the same length; however, skilled persons will appreciate that small differences in length can be acceptable. The length of each fiber element, in the embodiment shown, can be on the order of tens of centimeters; however, skilled persons will appreciate that longer lengths can be used.

Each fiber element 608 is optically connected to a three port or four-port optical circulator 610 which is in turn is optically connected to amplitude modulating device 614. In some embodiments, amplitude modulating device 614 can be a ring resonator structure with voltage controlled temperature used to amplitude modulate the received beam as a function of time, in some embodiments having an oscillation frequency from several kilohertz to gigahertz. In other embodiments, amplitude modulating device 614 can be a piezoelectric device or an acoustic optical modulator.

The modulated optical beam is output from amplitude modulating device 614 to circulator 610 through an optical fiber connection 616, and the now modulated beam is transmitted back along substantially the same path it originated from, through lenslet array 606 and stepped delay element 604.

Modulating the intensity of the optical beam with amplitude modulating device 614 can allow spatial mixing of the optical segments transmitted through optical fibres 608 with a reduced loss of data. Modulating the reference beam through such embodiments when the sample beam is spatially filtered can increase the performance of an OCT system when temporally encoding each optical delay path, and data in the resulting interferogram signal of a OCT system can be more complete than if the optical delay signals were encoded spatially. In some embodiments, a nano-photonic integrated optic device, such as a ring resonator with a temporal thermal controller, can be used to construct an intensity modulating device; however, persons skilled in the art will appreciate that there can be alternative ways to construct intensity modulating devices, especially in nano-photonic or integrated optics.

Figure 6D:
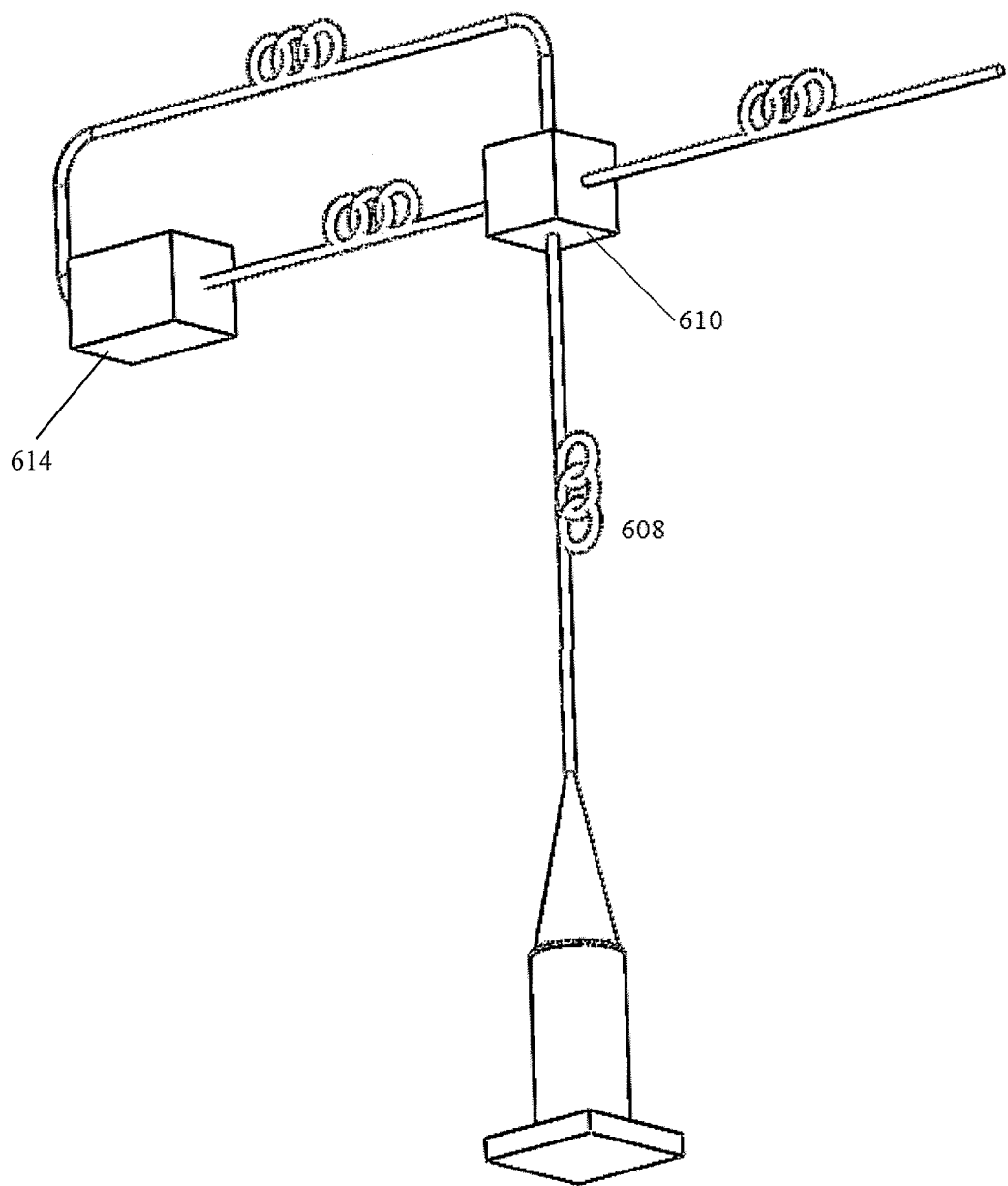

In other embodiments, stepped delay element 604 can be removed and a plurality of reflective mirrors can be introduced to operate as a delay element, such as delay element 404. In such embodiments, optical circulator 610 connected to each fiber element 608 can be a four-part circulator, as shown in FIG. 6D. Each four-port circulator's fourth output can be directed at one of the plurality of reflective mirrors and each mirror can be positioned at a distance from its associated four-port circulator relative to the other reflective mirror/four-port modulator pairs, which can introduce a delay in each optical signal transmitted back along reference beam 602.

Figure 7:
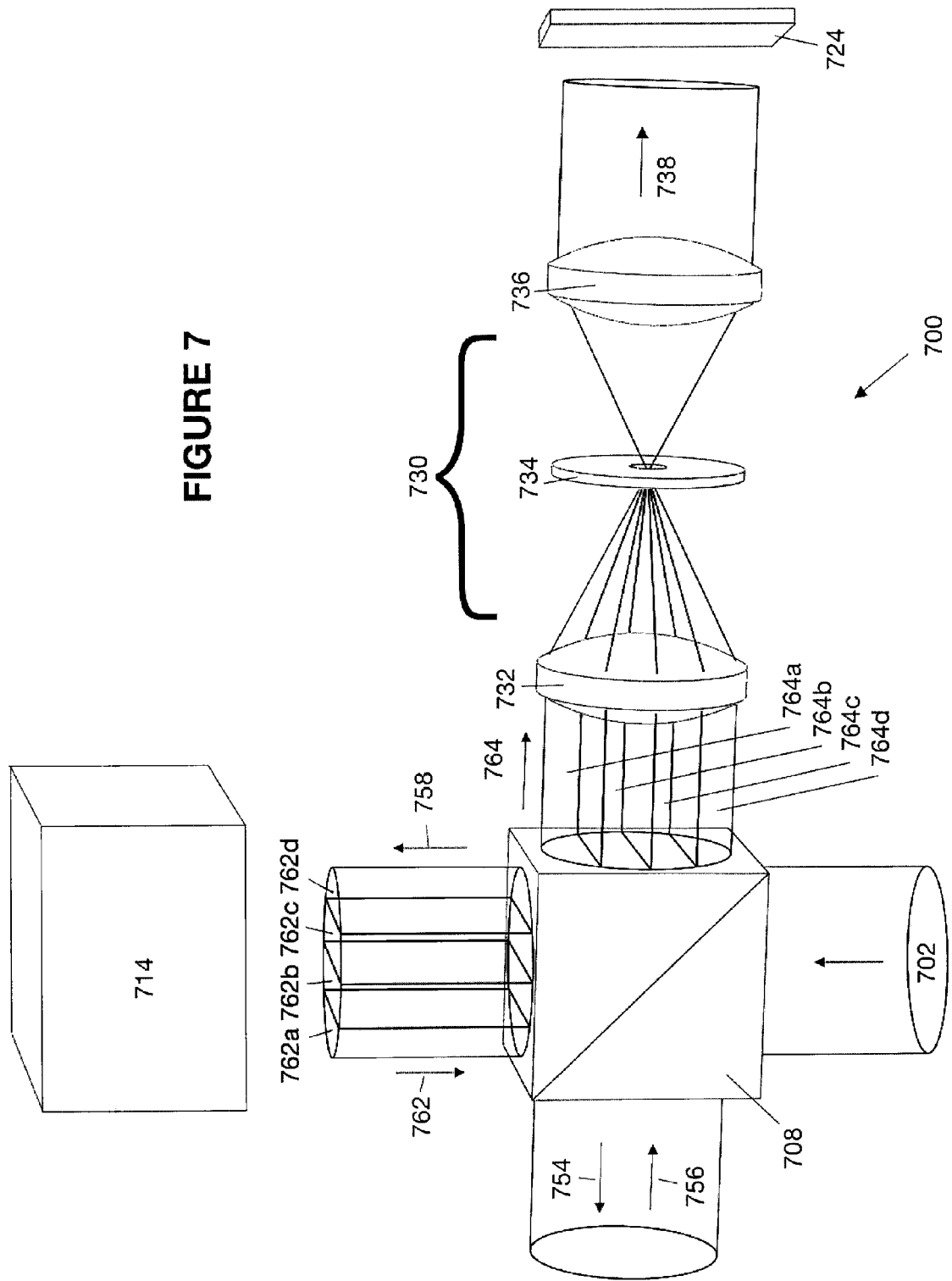
FIG. 7 shows the embodiment of a time domain frequency domain OCT system that incorporates a delay module having a time encoding delay element shown in FIG. 6A and 6B

With reference to FIG. 7, an embodiment of OCT system 700 is shown, being a TDFD OCT imaging system. In the embodiment shown, OCT system 700 comprises beam splitter 708, delay module 714, spatial filter system 730 and detector array 724.

In operation, optical source beam 702, which, in the embodiment shown, is a collimated beam, is received by beam splitter 708, which in some embodiments can be a 50:50 cube beam splitter, a rectangular splitter, a pellicle splitter, or other appropriate beam splitter. Beam splitter 708 splits optical source beam 702 into sample beam 754, directed toward a sample (not shown) and reference beam 758, directed towards delay module 714.

In the embodiment shown, sample beam 754 interacts with a sample (not shown) and reflects and/or disperses off the sample surface to generate return beam 756, directed back towards beam splitter 708. Reference beam 758 is directed towards delay module 714 which, in some embodiments is a delay element that can divide reference beam 758 into a plurality of segments or sub-pupils, each having a different delay or optical path length. Each of the sub-pupils are received by a reflective element (not shown) which generates delayed reflected beam 762, which is comprised of a plurality of segments or sub-pupils 762a, 762b, 762c and 762d, each having a different delay corresponding to the delay introduced by the delay element directed back towards beam splitter 708 along the same path as reference beam 758. While four segments are provided in the embodiment shown, skilled persons will understand that any appropriate number of segments or sub-pupils can be generated. In some embodiments, the segments or sub-pupils 762a, 762b, 762c and 762d can be generated by, for example, the transmissive delay system 600 shown in FIG. 6.

Beam splitter 708 receives delayed reflected beam 762 (comprised of segments or sub-pupils 762a, 762b, 762c and 762d) and sample return beam 756 and directs a portion of delayed reflected beam 762 and return beam 756 toward spatial filter system 730, interfering delayed reflected beam 762 with return beam 756 to generate interferogram beam 764. In the embodiment shown, interferogram beam 764 comprises a plurality of segments or sub-pupil interferograms 764a, 764b, 764c and 764d, each representative of the interferogram generated by interfering segments or sub-pupils 762a, 762b, 762c and 762d with return beam 756.

Interferogram beam 764 is received by spatial filter system 730, which is comprised of focusing lens 732, pinhole 734 and re-collimating lens 736 to generate spatially filtered beam 738. In the embodiment shown, spatial filter system 730 can filter all spatial information relating to the optical delay introduced by delay module 714, which can reject non-back scattered light, which can reduce background noise in interferogram beam 764. For example, in the embodiment shown, interferogram beam 764 is focused by focusing lens 732 onto pinhole 734 which can filter randomly scattered light or glare allowing light that was reflected back on axis to exit pinhole 734. Interferogram beam 764 can then be recollimated by re-collimating lens 736 and directed toward detector array 724.

Spatially filtered beam 738 is received by detector array 724 for analysis. In the embodiment shown, spatially filtered beam 738 is comprised of a superposition of all modulation frequencies of interferogram signal 764. In the embodiment shown, detector array 724 can record many spectra as a function of time such that temporal encoding information is recovered from spatially filtered beam 738, and in some embodiments can be a fast detector that can record at rates that are twice the temporal bandwidth, while in other embodiments, detector 724 can be a slower detector capable of recording a downmixed optical signal, in which the downmixer device comprises a three-port optical circulator optically connected to an amplitude modulating device, similar to the optical circulator and amplitude modulating device arrangement described above with reference to FIG. 6.

In some embodiments, it may be of benefit to separate various segments or sub-pupils at various positions, for example, in TDFD OCT embodiments, each interferogram may be measured independently by a plurality of detector arrays, one for each interferogram. For example, it may be beneficial to separate segments or sub-pupils corresponding to interferograms for detection and analysis by a detector array, where detector arrays are sized such that they may not be capable of being positioned in such proximity to each other to receive a interferometer signal comprised of a plurality of sub-pupil interferometers.

Figure 8:
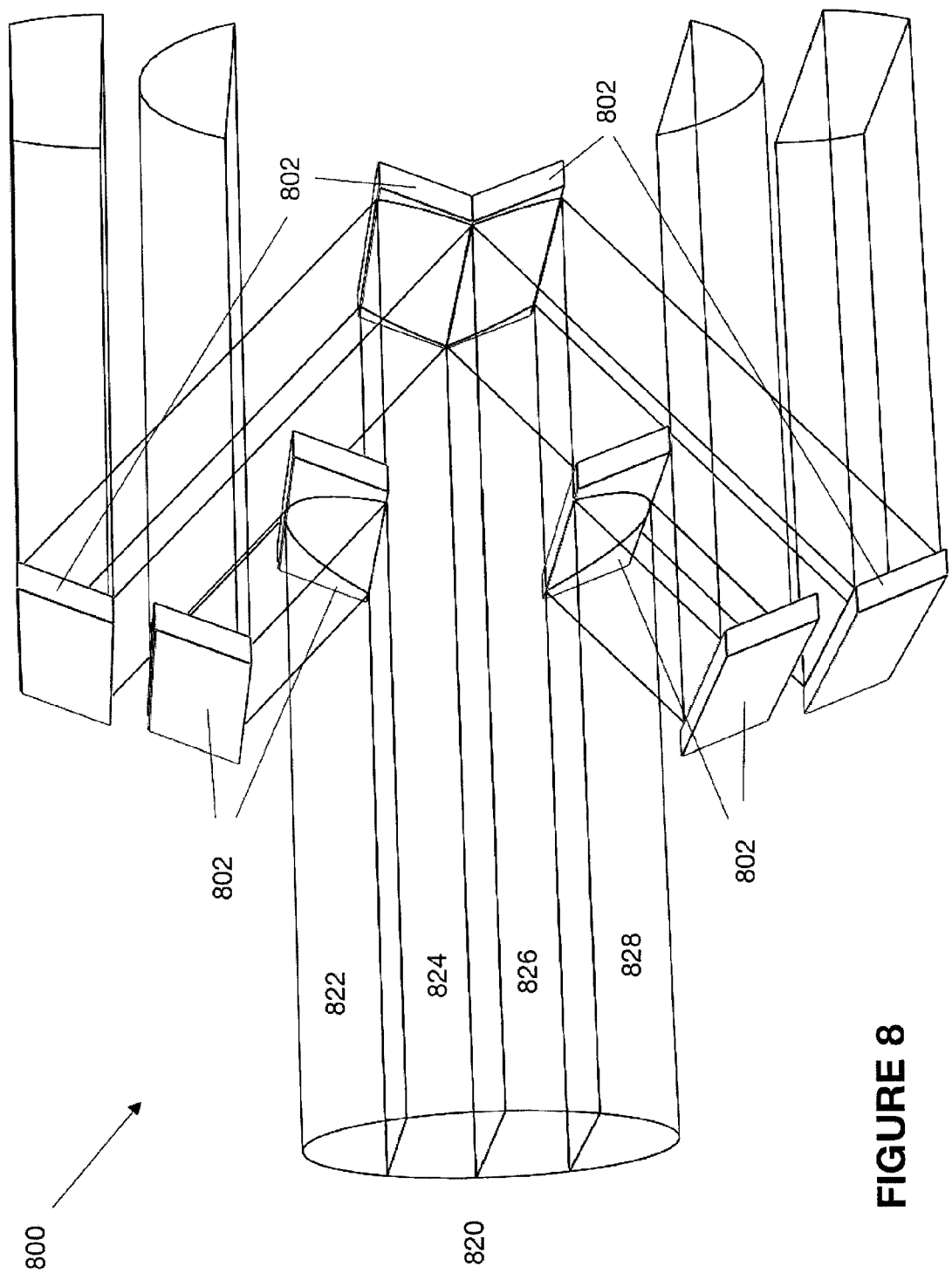
FIG. 8 shows an embodiment of a sub-pupil spatial separator.

For example, with reference to FIG. 8, sub-pupil spatial separator 800 is shown, comprising a plurality of reflective element pairs 802, each positioned to receive a segment or sub-pupil and spatially separate each segment or sub-pupil. In the embodiment shown, an input beam 820 which is comprised of sub-pupils 822, 824, 826 and 828 is directed toward sub-pupil spatial separator 800, each being received by a reflective element pair 802. While in the embodiment shown, input beam 820 is comprised of four sub-pupils, skilled persons will understand that an input beam can be comprised of any number of sub-pupils, where each can be received by a reflective element pair 802 that has been positioned appropriately to spatially separate the sub-pupils.

In the embodiment shown, each sub-pupil 822, 824, 826 and 828 is received by a first reflective element of one of the reflective element pairs 802, which can be a minor with a coating of silver, gold, a dielectric coating or other appropriate coating to reflect a light beam. Each sub-pupil 822, 824, 826 and 828 is reflected off a first reflective element of one of the reflective element pairs 802 to a corresponding second reflective element of the reflective element pair 802 which subsequently transmits the reflected sub-pupil 822, 824, 826 and 828 in a desired direction.

As shown in FIG. 8, the first reflective element of the reflective element pairs 802 is positioned to receive substantially all of a corresponding sub-pupil 822, 824, 826 or 828, and the corresponding second reflective element of the reflective element pair 802 is positioned such that a sub-pupil 822, 824, 826 and 828 is directed in a desired direction and positioned such that it is spatially separated from each of the other sub-pupils 822, 824, 826 and 828.

Figure 9:
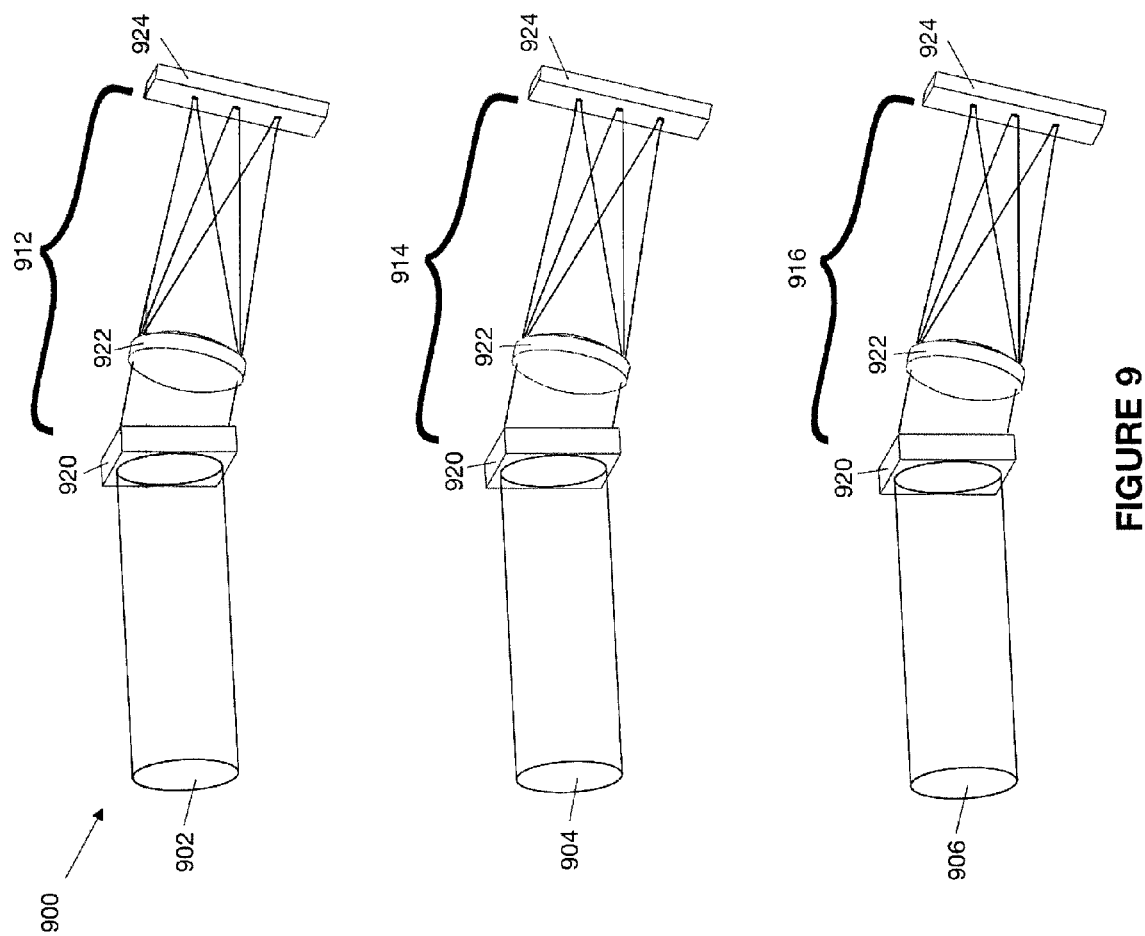
FIG. 9 shows a dispersive element with multiple 1-dimensional detectors.

With additional reference to FIG. 9, dispersive spectrometer 900 is shown which can receive spatially separated sub-pupil beams 902, 904 and 906 which can be generated by a sub-pupil special separator similar to sub-pupil spatial separator 800 shown in FIG. 8. In the embodiment shown, dispersive spectrometer 900 comprises three dispersive elements 912, 914 and 916; however, skilled persons will appreciate that dispersive spectrometer 900 can comprise a plurality of dispersive elements and can, in some embodiments, comprise one dispersive embodiment for each separated sub-pupil beam received.

In the embodiment shown, each dispersive element 912, 914 and 916 can be comprised of diffraction grating 920 capable of separating a broadband separated sub-pupil beam 902, 904 or 906 into a plurality of narrowband spectra which are received by lens 922 and focused onto detector array 924 for spectral analysis.

Figure 10:
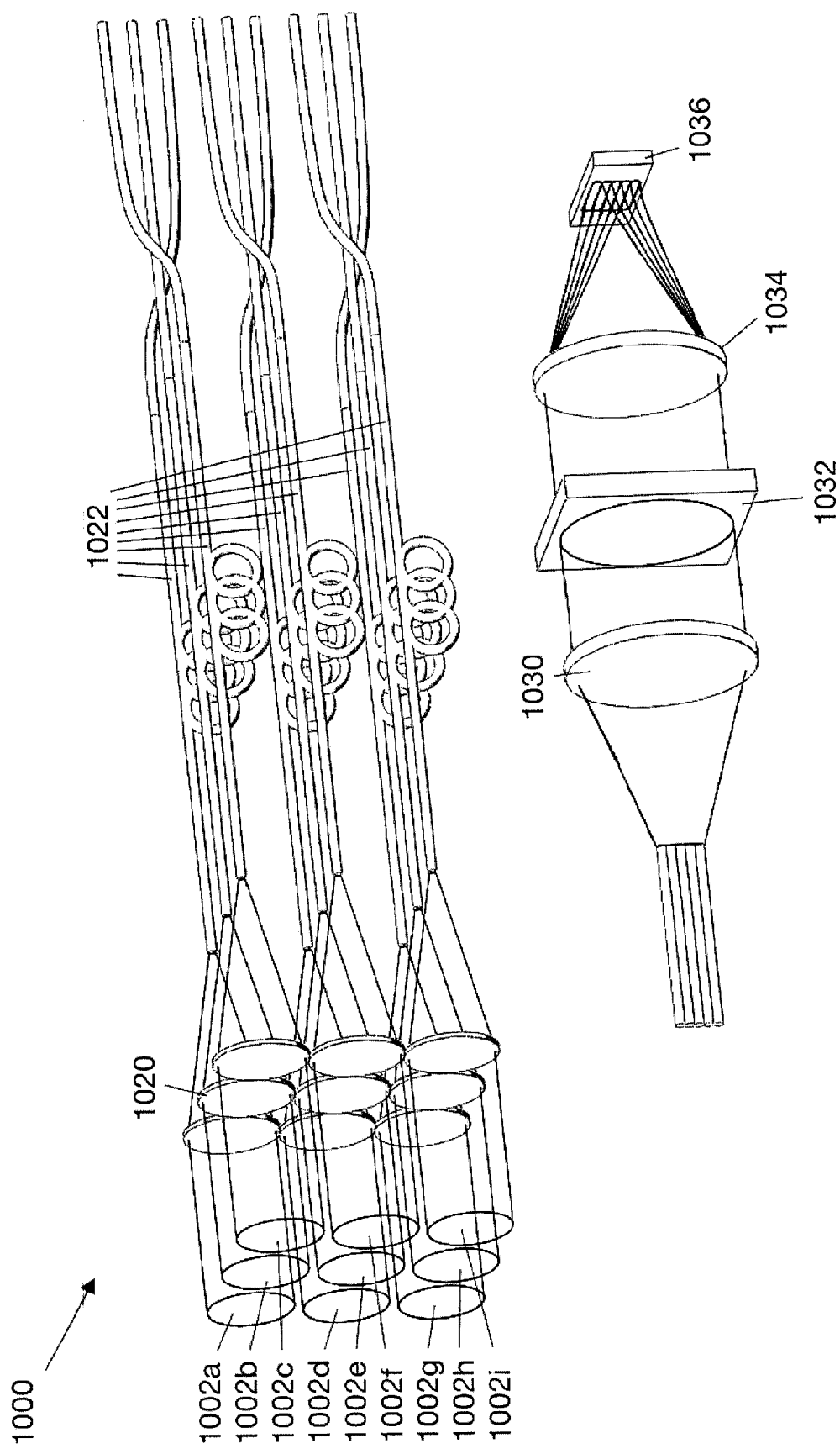
FIG. 10 shows an embodiment of a dispersive element with a 2-dimensional detector.

Referring to FIG. 10, dispersive spectrometer 1000 is shown capable of receiving a plurality of spatially separated sub-pupil beams 1002a-i, that can be generated by a sub-pupil spatial separator similar to sub-pupil spatial separator 800, shown in FIG. 8. In the embodiment shown, dispersive spectrometer 1000 is capable of receiving nine spatially separated sub-pupil beams; however, skilled persons will understand that in other embodiments of spectrometer 1000, any number of spatially separated sub-pupil beams can be received.

Each of the spatially separated sub-pupil beams 1002a-i is received by a corresponding lens of lenslet array 1020, which focuses each of the separated sub-pupil beams 1002a-i into a corresponding fiber 1022, and in the embodiment shown each fiber 1022 is a single mode fiber.

In the embodiment shown, each of the corresponding fibers 1022 are subsequently bundled together forming a bundle of fibers 1022, each arranged in a linear fashion perpendicular to the dispersion axis in dispersive spectrometer 1000; however, skilled persons will appreciate that each corresponding fiber 1022 can be positioned separately from the other corresponding fibers 1022, without being bundled. Bundling fibers 1022 into a linear array from a rectangular array can be achieved in an efficient manner by reducing the cladding diameter and placing the cores close together. This can be achieved by increasing the index of refraction of the core by adding in higher concentration of doping material or by other techniques. In some embodiments, the length of fibers 1022 can be on the order of tens of centimeters and in other embodiments, the length of fibers 1022 can be 2 or 3 meters long; however, skilled persons will understand that other lengths can be used.

The outputs of the bundle of fibers 1022, which, in the embodiment shown, are arranged in a linear arrangement, are received by collimating lens 1030, forming a collimated beam that is transmitted to diffraction grating 1032. Diffraction grating 1032 divides the received collimated beam into a plurality of narrowband optical signals, received by lens 1034 to form a group of converging beams, arranged vertically and each corresponding to of sub-pupils 1002a-i. The vertical arrangement of narrowband optical signal is received by detector array 1036 for spectral analysis.

In the embodiment shown, detector array 1036 is a two-dimensional detector comprising sections that are capable of receiving each spectra representative of each output signal from each fiber 1022 for analysis.

In embodiments where dispersive spectrometer 1000 is used in a TDFD OCT system, each of the outputs from each fiber 1022 can generate an interferogram representative of a different delay or optical path length. In such embodiments, detector array 1036 receives a plurality of linearly arranged interferograms, each representative of a narrowband of the interferogram output be each fiber 1022.

Figure 13:
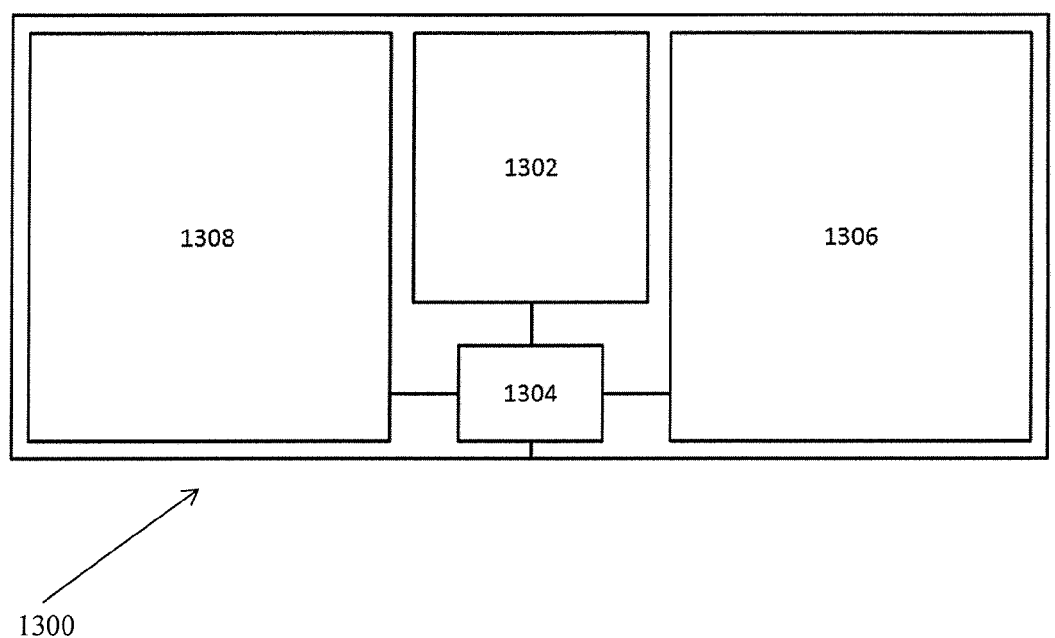
FIG. 13 shows an embodiment of a time domain-frequency domain OCT system formed on a planar substrate.

Referring to FIG. 13, OCT system 1300 comprised of a light source 1302, a splitter 1304, a delay module 1306 and a spectrometer detector module 1308, is shown formed on a planar substrate. In the embodiment shown light from the delay module 1306 and light source 1302 are received by the splitter 1304 and transferred to a spectrometer detector module 1308 via a waveguide on a planar substrate. Light is coupled between the splitter 1304 and the sample arm (not on the planar substrate) via a waveguide.

The present invention has been described with regard to specific embodiments. However, it will be obvious to persons skilled in the art that a number of variants and modifications can be made without departing from the scope of the invention as described herein.

The invention claimed is:

1. An optical coherence tomography (OCT) system comprising:
    a splitter configured to receive and split an optical source beam generating a reference beam and a sample beam, the sample beam directed at a sample and interacting with the sample to generate a return beam;
    a delay module configured to receive and introduce multiple optical delays in the reference beam, to generate a plurality of delayed reference beams configured to interfere with the return beam to generate a plurality of interferograms;
    a spatial filter system capable of filtering randomly scattered light from at least one of the return beam or the interferograms; and
    a detector module to receive the interferograms and record the intensity as a function of wavelength and delay position for generating a plurality of OCT images as a function of wavelength.

2. The OCT system of claim 1, wherein the spatial filter system comprises:
    a first lens to receive and focus the at least one of the return beam or the interferograms;
    a pinhole to receive the focused at least one of the return beam or the interferograms and outputting a conical filtered beam; and
    a second lens to receive and collimate the conical filtered beam.

3. The OCT system of claim 2, wherein the delayed reference beams and the return beam are each directed to the splitter, and the interferograms are generated by the splitter.

4. The OCT system of claim 3, wherein the delay module is a liquid crystal retarder.

5. The OCT system of claim 3, wherein each of the plurality of reference beam portions has a different optical delay.

6. The OCT system of claim 5, wherein the delay module comprises a delay element and a reflective element, and wherein the delay element and the reflective element are the same element or separate elements.

7. The OCT system of claim 6, wherein the delay element is a stepped plate.

8. The OCT system of claim 6, wherein the delay element is a multi-subpupil liquid crystal retarder.

9. The OCT system of claim 5, wherein the delay module is a reflective stepped plate.

10. The OCT system of claim 5, wherein the delay module comprises a stepped delay element to generate the plurality of portions, and a three-or-more port optical circulator to receive each of the portions from the stepped delay element, and an amplitude modulating device optically connected to each optical circulator to generate a modulated delayed reference beam from each of the portions.

11. The OCT system of claim 5, wherein the delay module comprises a reflective element and a four-port optical circulator to generate the delayed reference beams, wherein a port of the four-port optical circulator is capable of directing the reference beam to the reflective element which is positioned to generate the optical delay.

12. The OCT system of claim 3, further comprising a plurality of reflective surfaces arranged to positionally separate at least one of the delayed reference beams or the interferograms, wherein the reflective surfaces are positioned within the delay module or separate from the delay module.

13. The OCT system of claim 1, wherein the delay element introduces the optical delay prior to and after the reference beam is reflected off a reflective element.

14. The OCT system of claim 1, wherein the splitter is a cube splitter, a rectangular splitter or a pellicle splitter.

15. The OCT system of claim 1, further comprising a dispersive element for receiving the interferograms and generating a plurality of narrowband signals representative of a spectra of the interferograms, wherein the detector module receives the plurality of narrowband signals for spectral analysis.

16. The OCT system of claim 1, wherein the optical source is a tunable optical source.

17. The OCT system of claim 1, wherein the splitter, the spatial filter system, the delay module and the detector module are each formed on the same or different planar substrates.

18. A method of obtaining spatial and spectral information about a substance, comprising:
    splitting an optical source beam into a reference beam and a sample beam;
    interacting the sample beam with a sample to generate a return beam;

introducing a plurality of delays into the reference beam to generate a plurality of delayed reference beam portions;

interfering each of the delayed reference beam portions with the return beam to generate a set of interferograms;

extracting an interference spectrum from each of the interferograms, each interference spectrum corresponding to a depth of the substance at a scanned location at which the sample beam interacted with the sample; and extracting a spectral reflectivity for each of the interference spectrums to determine color of the substance at the depth of the substance at the scanned location.

19. The method of claim 18, wherein the extracting the interference spectrum comprises using a Fourier transform, and the extracting the spectral reflectivity comprises using least-squares modeling.

* * * * *